United States Patent Office 2,828,839
Patented Apr. 1, 1958

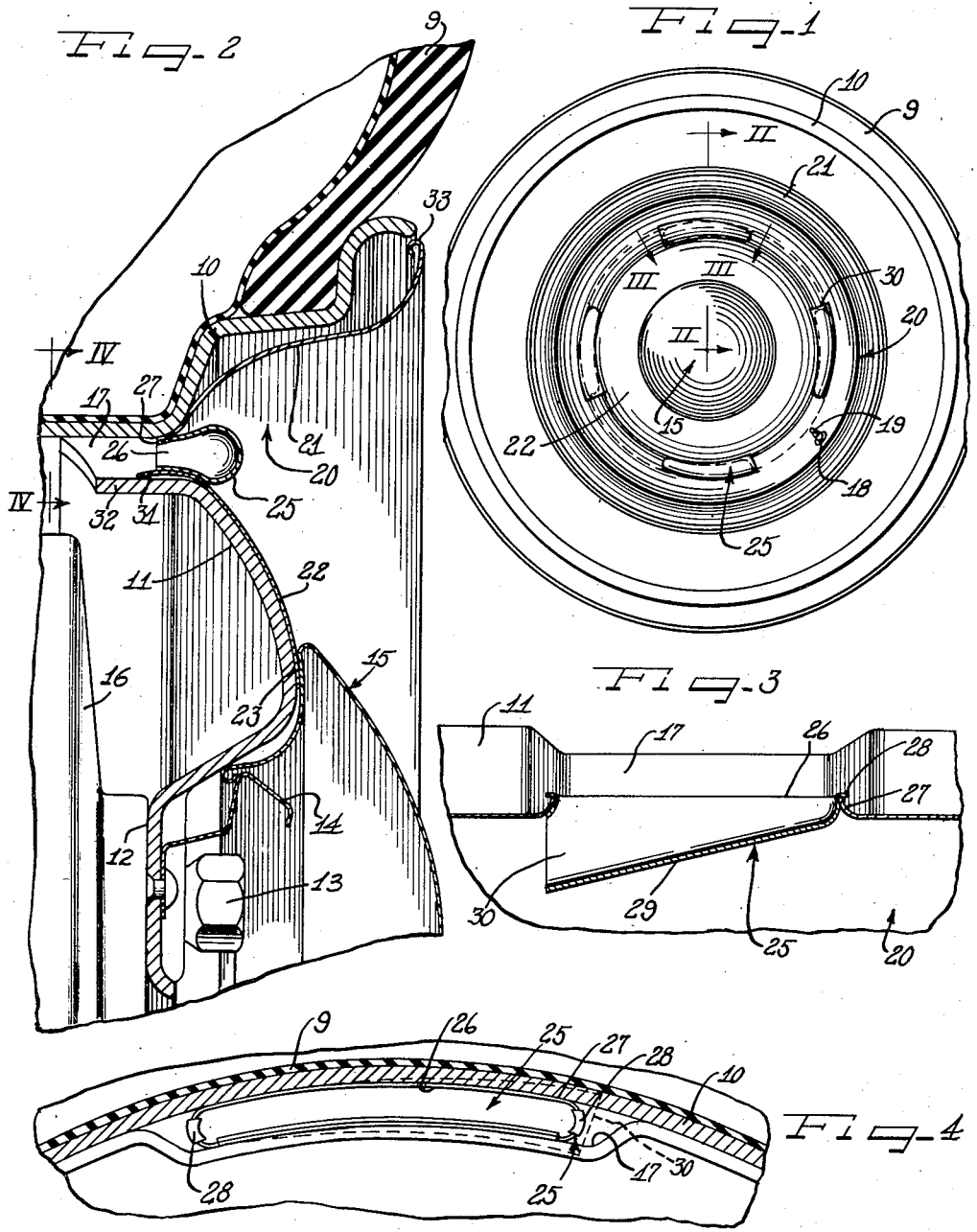

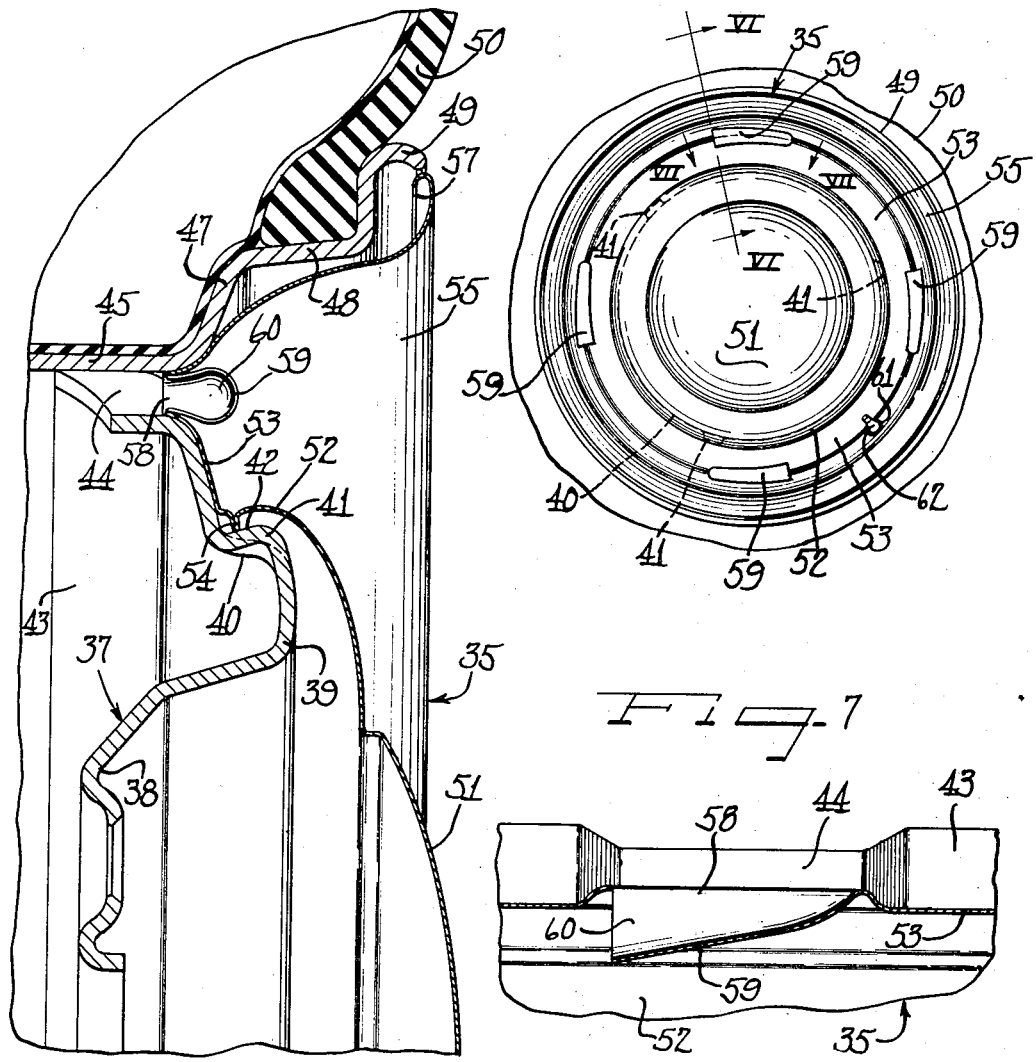

2,828,839

WHEEL COVER WITH AIR SCOOPS

George Albert Lyon, Detroit, Mich.

Application December 10, 1954, Serial No. 475,603

4 Claims. (Cl. 188—264)

This invention relates to covers for wheels and more particularly to covers for use on automobile wheels.

The present application is a continuation-in-part of my application Serial No. 245,939 filed September 10, 1951, now abandoned.

Recently, due to changes made in brakes on automobile wheels by car manufacturers, some difficulty has been encountered due to the overheating of the brakes. As a consequence, manufacturers have been on the lookout for some way of eliminating this difficulty such as by supplementing the cooling of the brake.

It is an object, therefore, of this invention to provide a new wheel cover for a wheel which embodies as a component part thereof means for assisting in supplementing the cooling of the brake usually associated with the wheel.

Another object of this invention is to provide a wheel cover with improved air-directing means for forcibly directing air into the interior of the wheel around the brake drum during forward movement of the vehicle, or for effecting movement out from the inside of the wheel in cooling circulation over the brake drum.

A further object of the invention is to provide a novel wheel cover in association with a vehicle wheel having openings therethrough and with means on the cover for substantially direct circulation of air through the cover and through the openings in the wheel for brake drum cooling and the like.

Still another object of the invention is to provide a novel cover construction that lends itself readily to either a supplementary trim type of cover or as a full disk cover comprising the entire covering member for a wheel.

Other objects, features and advantages of this invention will more fully appear from the following detailed description taken in connection with the accompanying drawings, in which:

Figure 1 is a fragmentary side elevational view of a wheel structure having my novel cover with air scoop means applied thereto;

Figure 2 is an enlarged fragmentary radial sectional view taken on substantially the line II—II of Figure 1 and showing the manner in which the cover and scoop means cooperate with the wheel;

Figure 3 is an enlarged fragmentary sectional view taken on substantially the line III—III of Figure 1;

Figure 4 is a fragmentary sectional view taken on substantially the line IV—IV of Figure 2;

Figure 5 is a side elevational view of a wheel structure showing a modification;

Figure 6 is a fragmentary enlarged sectional view taken substantially on the line VI—VI of Figure 5; and—

Figure 7 is an enlarged sectional detail view taken on substantially the line VII—VII of Figure 5.

The reference character 9 designates generally a conventional pneumatic tire and tube assembly mounted in the usual way upon a conventional multi-flanged tire rim 10 which is sometimes referred to as a drop-center type of tire rim.

The tire rim 10 is secured at spaced intervals in the usual way to a wheel body member 11 to form generally what is called a modern type of an automobile wheel. The body member 11 is usually a dished stamping and includes a central bolt-on flange 12 by means of which the wheel is detachably fastened by any suitable means such as bolts or cap screws 13 to a part on the axle of the automobile and in association with a conventional drum 16.

The bolt-on flange 12 is provided with the usual goose-neck shaped hub cap retaining spring clips 14 for detachably holding on the wheel body 11 a hub cap designated generally by the reference character 15.

The wheel body 11 between its points of attachment to the tire rim 10 has a plurality of usual spaced air circulating openings 17. In addition, the pneumatic tire and tube assembly is provided with a conventional valve stem 18 (Fig. 1) which is adapted to project in the usual way through an opening 19 in a wheel cover 20 with which my invention is particularly concerned.

The wheel cover 20 is of a circular shape and includes confronting divergent annular portions 21 and 22 with their junction substantially at the area of the wheel openings 17. The radially inner divergent portion 22 has an inner margin 23 adapted to be clamped to the wheel body 11 by the detachable hub cap 15 for the purpose of retaining the wheel cover on the wheel.

The cover 20 thus far described comprises a unitary dished metallic stamping which may be made from any suitable sheet material such, for example, as stainless steel sheet or the like. Its exterior or outer side may be given a high lustrous finish or in the alternative may be painted to blend in with the other colors employed on the automotive vehicle.

As alluded to hereinbefore, this cover 20, in keeping with the objectives of this invention, is provided with air scoop means in the form of a plurality of circumferentially spaced air scoops designated generally by the reference character 25. Since these scoops are identical, a description of one will suffice for all.

Each scoop 25 comprises a metallic stamping and is not only arranged to be aligned with a wheel opening 17, when the cover is on the wheel, but is also aligned with an opening 26 formed in the cover adjacent the junction of the two divergent portions 21 and 22. The rear side of this scoop 29 is formed open and has its inner edge provided with turned tangs 28—28 (Figs. 3 and 4) interlocked with a slightly rearwardly turned edge 27 defining the associated opening 26 in the cover. Any suitable press means may be employed for interlocking the scoop with the edge 27.

It will be perceived from Figure 3 that each scoop is generally on a wedge-like cross-sectional shape and has one end formed open at 30 to define the air scoop opening. In addition, each scoop in the direction of the circumference of the wheel, as shown in Fig. 1, is slightly arcuate. Also, it will be perceived from Figure 1 that the open end 30 of each scoop may face in the direction of movement of the wheel so as to scoop up air as the wheel rotates.

Moreover, the wheel cover, when it is on the wheel, not only is in engagement with the wheel body 11, but at the scoops 25 telescopes the wheel openings 17 and thereby assists in centering and the retention of the cover on the wheel. In fact, a portion of the edge 27 of the cover, as indicated at 31 in Figure 2, may yieldably engage the portion 32 of the wheel body defining the opening 17 so that resilient pressure is exerted by the cover on the wheel body inside the opening. In reality, this permits of a wedge-like cooperation of the cover at the location of its scoops with the areas of the wheel defining the wheel openings 17.

In the use of these covers on automobile wheels, it will be apparent that when the wheel turns in the direction of the open ends of the scoops 25, air will be picked up or scooped in by the scoops and directed inwardly through the wheel openings 17 and thereby in cooling relation to the brake drum 16. If this action is desired, of course, it will be desirable to have left-hand and right-hand covers on which the open ends of the scoops 25 will be directed in the direction of rotation on both left and right-hand wheels.

On the other hand, if it is desired to improve or accelerate movement of air from the inside of the wheel outwardly through the openings at the scoops 25, then the scoops will be placed on the wheel with the closed ends of the scoops pointing in the direction of rotation. Thereby the scoops act as aspirating vanes or louvers to suck air from the inside of the wheel outwardly and out of the air impelling or scoop members 25.

In either event, the fact that the scoops 25 are located in registration with the wheel openings 17 and thereby effectively compel movement of air through the scoop or air impelling members 25 for movement through the wheel openings 17, without any loss of air motivating effect of the impelling members, highly efficient results are attained.

From the foregoing it is clear that in the rotation of the wheel air is pulled into or forced out from the indentation of the cover between the divergent portions 21 and 22 by the air motivating members 25 which conduct such air directly through the cover openings 26 and through the wheel openings 17 to or from the brake drum area on the inside of the wheel, thereby assisting in the cooling of the wheel. In addition, as aforesaid, the scoop areas or portions of the cover telescopingly cooperate with the wheel openings 17 in the centering and retention of the cover on the wheel.

The cover is easily removable from the wheel by first removing the hub cap 15 in the usual way and by thereafter inserting a screw driver under the turned outer edge 33 of the cover so that its scooped portions may be removed from telescoping cooperation with the wheel openings 17.

In applying the cover to the wheel, the openings 26 are first aligned with the wheel openings 17 and the cover is then pressed axially into the wheel until it bottoms against the body part 11. Thereafter the hub cap 15 may be snapped on and into retained engagement by the clips 14 to hold the edge 23 of the cover tightly against the wheel body 11.

In the modification of Figs. 5–7, a cover 35 is applied to the outer side of a wheel having, at least in part, attributes of the wheel covered in my Patent 2,445,330, dated July 20, 1948. Such a wheel comprises a disk spider wheel body 37 having a dished central bolt-on flange 38 adapted to be attached to a brake drum similarly as the wheel attachment flange 12 is secured to the brake drum 16. Encircling the bolt-on flange 38 is an annular axially outwardly projecting nose bulge 39 provided at its radially outer side with a generally radially outwardly facing annular shoulder 40 having at a plurality of points such as three generally radially outwardly projecting cover retaining bumps 41 provided with generally undercut axially inwardly and radially outwardly facing cover retaining shoulders 42. Radially outwardly from the bumps 42 the wheel body is provided with an attachment flange 43 having a plurality such as four insets therein providing wheel openings 44.

The attachment flange 43 is suitably secured to a base flange 45 of a tire rim having an outer side flange 47 merging with an intermediate generally axially outwardly extending and radially outwardly sloping flange 48 merging with a terminal flange 49. The flanges of the tire rim are of the drop center type enabling the same to support a tire and tube assembly 50 or a tubeless tire.

In this instance, the cover 35 is of the full disk type made from a single piece of sheet metal such as stainless steel, brass or other suitable sheet material and of a diameter to substantially entirely cover the outer side of the wheel. To this end, the cover 35 has a central crown portion 51 provided with a generally axially inwardly extending flexible side wall 52 of a diameter to engage in spaced or clearance relation about the retaining bumps 41 in assembly. The flexible side wall 52 is of annular shape and merges with an intermediate dished cover portion 53 in an annular generally radially inwardly and slightly axially outwardly sloping fold flange 54 of an inside or tip diameter slightly smaller than the diameter described about the retaining bump shoulders 42. Thereby the retaining fold flange 54 is adapted to engage in press-on, pry-off relation with the retaining bumps 41 and more particularly the shoulders 42 thereof for retaining the cover on the wheel.

The dished annular intermediate portion 53 of the cover is disposed as a juncture portion between relatively divergent portions of the cover comprising the side wall 52 of the crown portion and an annular radially outer generally radially and axially outwardly directed cover portion 55 which is adapted to overlie the tire rim and has an outer underturned terminal bead reinforcing flange 57 adapted in assembly with the wheel to lie adjacent the tip of the terminal flange 49 of the tire rim.

In assembly with the wheel, the intermediate dished juncture portion 53 of the cover is adapted to lie close to and preferably against the juncture portions of the wheel body 37 and the tire rim and more particularly the radially inner portion of the side flange 47 of the tire rim.

For promoting air circulation through the wheel openings 44, the cover intermediate portion 53 is provided at intervals registering with the wheel openings 44, with openings 58 circumferentially elongated generally conformable to the wheel openings 44 and provided with air circulation promoting vane, louver, hood-like scoop elements or portions 59. In the present instance the air moving or motivating elements 59 are preferably pressed out integrally in one piece with the wheel cover plate 35 and more particularly pressed out in making the openings 58. To this end the members 59 are shaped to project axially outwardly from the openings 58 and in effect close the openings 58 at the opposite radial sides thereof and at one end, but with open mouths 60 of the members 59 at one of their ends facing in one circumferential direction. Thereby, in the rotation of the wheel in the direction of the mouths 60 air will be scooped into the members 59 and thereby directed on through the wheel openings 44 to the inside of the wheel. On the other hand, if the wheel is rotated in the opposite direction, an aspirating or sucking effect is produced by the members 59 so that air is drawn in from the inner side of the wheel through the wheel openings 44 and out through the members 59 and outwardly relative to the cover from the mouths 60 thereof.

In order to maintain the cover 35 against rotation on the wheel and maintain the openings 58 in registration with the wheel openings 44, the cover portion 53 about the openings 58 is preferably depressed inwardly generally conformable to the wheel openings so that, in effect the inner moving or scoop members 59 have the base portions thereof generally telescoped within the wheel openings, and more particularly the inwardly depressed projections from the scoops or vane members cooperate with the perimeters of the wheel openings to maintain the scoops in operative alignment with the wheel openings.

Intermediate a pair of the air motivating elements 59, the cover is preferably provided in the radially outer portion of the intermediate or dished part 53 thereof with a valve stem aperture 61 receptive of a valve stem 62. It will be appreciated that by holding the cover against turning by virtue of the indentations about the scoop members 59, any tendency for turning of the cover on the wheel is avoided and thereby distortion of the valve stem 62 is avoided.

Application of the cover 35 to the wheel is easily effected by registering the valve stem opening 61 with the valve stem 62 and then working the retaining rib flange 54 of the cover into retaining engagement with the retaining bumps 41 by pressing the cover axially inwardly onto the wheel. In this relationship the intermediate portion 53 of the cover by nesting against the wheel body and the tire rim avoids any appreciable annular space between the cover and the wheel at the wheel openings 44 and therefore the air motivating inclined members 59 will operate with full effectiveness in effecting movement of air through the wheel openings 44, either inwardly or outwardly as explained hereinabove.

It will be understood that modifications and variations may be effected without departing from the scope of the novel concepts of the present invention.

I claim as my invention:

1. In a cover structure for a wheel including a multi-flanged tire rim and a wheel body having a generally axially inwardly extending flange connected to said rim at spaced points and extending in spaced relation to said rim at intervals between said points to define generally arcuate elongated openings, a circular cover member for disposition on the wheel over the junction of said rim and body member and having a plurality of openings circumferentially spaced for alignment with said wheel openings, a portion of the cover defining each of said openings extending axially inwardly in overlying relation to said wheel body flange within the associated wheel opening, and scoops aligned with the openings in the cover, the axially inner side of each scoop having an opening with the axially inner margin portion of the scoop interlocked with the adjacent margin of the associated cover opening, each of the scoops extending axially outwardly from the outer surface of said member and having a scoop opening for scooping up air in the forward movement of the wheel for conducting said scooped-up air from the outer side of the cover through the scoop opening, the opening in the axially inner side of the scoop, the opening in the cover, and directly into the associated wheel opening.

2. In a wheel structure including joined rim and body parts with openings at their junction, a circular wheel cover comprising radially divergent portions with their junction generally opposite said openings, said cover having air scoops inclined axially outwardly at said cover junction and extensions projecting axially rearwardly from said scoops into telescoping cooperation with said wheel openings to maintain said scoops in alignment therewith.

3. The structure of claim 2 further characterized by said cover openings being defined by turned edges interlocked with the scoops in said cover junction.

4. In a wheel structure including a tire rim and a wheel body affording openings through the wheel, a cover for the outer side of the wheel having a plurality of scoop-like air motivating elements thereon opening in one circumferential direction and closed in the opposite circumferential direction of the cover and each with an air passage inside one of said wheel openings, said air motivating elements having at their axially inner sides and at said air passages means engaging with the wheel at said wheel openings for holding the cover against turning on the wheel.

References Cited in the file of this patent

UNITED STATES PATENTS

| | | |
|---|---|---|
| 2,092,975 | Hunt et al. | Sept. 14, 1937 |
| 2,130,207 | Van Halteren | Sept. 13, 1938 |
| 2,143,950 | Kliesrath | Jan. 17, 1939 |
| 2,148,211 | Lyon | Feb. 21, 1939 |
| 2,231,931 | Lyon | Feb. 18, 1941 |
| 2,248,707 | Horn | July 8, 1941 |
| 2,331,259 | Whitten | Oct. 5, 1943 |
| 2,445,330 | Lyon | July 20, 1948 |